United States Patent
Wetherbee et al.

(10) Patent No.: US 12,039,619 B2
(45) Date of Patent: Jul. 16, 2024

(54) USING AN IRRELEVANCE FILTER TO FACILITATE EFFICIENT RUL ANALYSES FOR ELECTRONIC DEVICES

(71) Applicant: ORACLE INTERNATIONAL CORPORATION, Redwood Shores, CA (US)

(72) Inventors: Edward R. Wetherbee, Omaha, NE (US); Kenny C. Gross, Escondido, CA (US)

(73) Assignee: Oracle International Corporaiton, Redwood Shores, CA (US)

( * ) Notice: Subject to any disclaimer, the term of this patent is extended or adjusted under 35 U.S.C. 154(b) by 175 days.

(21) Appl. No.: 17/741,709

(22) Filed: May 11, 2022

(65) Prior Publication Data

US 2022/0270189 A1  Aug. 25, 2022

Related U.S. Application Data

(63) Continuation of application No. 16/560,629, filed on Sep. 4, 2019, now Pat. No. 11,341,588.

(51) Int. Cl.
*G06Q 10/20* (2023.01)
*G06F 17/18* (2006.01)
(Continued)

(52) U.S. Cl.
CPC .............. *G06Q 50/06* (2013.01); *G06F 17/18* (2013.01); *G06N 5/04* (2013.01); *G06Q 10/0635* (2013.01); *G06Q 10/20* (2013.01)

(58) Field of Classification Search
CPC .... G06Q 50/06; G06Q 10/0635; G06Q 10/20; G06Q 10/04; G06F 17/18; G06N 5/04
See application file for complete search history.

(56) References Cited

U.S. PATENT DOCUMENTS

| 7,020,802 B2 | 3/2006 | Gross et al. |
| 7,281,112 B1 | 10/2007 | Gross et al. |

(Continued)

FOREIGN PATENT DOCUMENTS

| CN | 102072829 A | 5/2011 |
| CN | 107181543 A1 | 9/2017 |

(Continued)

OTHER PUBLICATIONS

Garcia-Martin Eva et al., "Estimation of Energy Consumption in Machine Learning," Journal of Parallel and Distributed Computing, Elsevier, Amsterdam, NL, vol. 134, Aug. 21, 2019 (Aug. 21, 2019), pp. 77-88.

(Continued)

*Primary Examiner* — Kandasamy Thangavelu
(74) *Attorney, Agent, or Firm* — Kraguljac Law Group, LLC (57) ABSTRACT

Systems and methods are described that estimates a remaining useful life (RUL) of an electronic device. Time-series signals gathered from sensors in the electronic device are received. Statistical changes are detected in the set of time-series signals that are deemed as anomalous signal patterns. Anomaly alarms are generated, wherein an anomaly alarm is generated for each of the anomalous signal patterns. An irrelevance filter is applied to the set of anomaly alarms to produce filtered anomaly alarms, wherein the irrelevance filter removes anomaly alarms associated with anomalous signal patterns that are not correlated with previous failures of similar electronic devices. A logistic-regression model is used to compute an RUL-based risk index for the electronic device based on the filtered anomaly alarms. When the risk index exceeds a risk-index threshold, a notification is generated indicating that the electronic device has a limited remaining useful life.

20 Claims, 4 Drawing Sheets

(51) Int. Cl.
   *G06N 5/04*       (2023.01)
   *G06Q 10/0635*    (2023.01)
   *G06Q 50/06*      (2012.01)

(56) References Cited

U.S. PATENT DOCUMENTS

| | | |
|---|---|---|
| 7,613,576 B2 | 11/2009 | Gross et al. |
| 7,613,580 B2 | 11/2009 | Gross et al. |
| 7,702,485 B2 | 4/2010 | Gross et al. |
| 7,869,977 B2 | 1/2011 | Lewis et al. |
| 8,055,594 B2 | 11/2011 | Dhanekula et al. |
| 8,069,490 B2 | 11/2011 | Gross et al. |
| 8,200,991 B2 | 6/2012 | Vaidyanathan et al. |
| 8,275,738 B2 | 9/2012 | Gross et al. |
| 8,341,759 B2 | 12/2012 | Gross et al. |
| 8,457,913 B2 | 6/2013 | Zwinger et al. |
| 8,543,346 B2 | 9/2013 | Gross et al. |
| 9,933,338 B2 | 4/2018 | Noda et al. |
| 10,149,169 B1 | 12/2018 | Keller |
| 10,452,510 B2 | 10/2019 | Gross et al. |
| 10,496,084 B2 | 12/2019 | Li et al. |
| 11,055,396 B2 | 7/2021 | Gross et al. |
| 2002/0183971 A1 | 12/2002 | Wegerich et al. |
| 2008/0140362 A1 | 6/2008 | Gross et al. |
| 2008/0252309 A1 | 10/2008 | Gross et al. |
| 2008/0252441 A1 | 10/2008 | McElfresh et al. |
| 2008/0256398 A1 | 10/2008 | Gross et al. |
| 2009/0099830 A1 | 4/2009 | Gross et al. |
| 2009/0125467 A1 | 5/2009 | Dhanekula et al. |
| 2009/0306920 A1 | 12/2009 | Zwinger et al. |
| 2010/0023282 A1 | 1/2010 | Lewis et al. |
| 2010/0033386 A1 | 2/2010 | Lewis et al. |
| 2010/0161525 A1 | 6/2010 | Gross et al. |
| 2010/0251039 A1* | 9/2010 | Hirohata ............... G06F 3/0685 714/704 |
| 2010/0305892 A1 | 12/2010 | Gross et al. |
| 2010/0306165 A1 | 12/2010 | Gross et al. |
| 2012/0030775 A1 | 2/2012 | Gross et al. |
| 2013/0157683 A1 | 6/2013 | Lymberopoulos et al. |
| 2014/0354300 A1 | 12/2014 | Ramachandran et al. |
| 2015/0137830 A1 | 5/2015 | Keller, III et al. |
| 2016/0098561 A1* | 4/2016 | Keller ................... G06F 21/566 726/24 |
| 2017/0163669 A1 | 6/2017 | Brown et al. |
| 2018/0011130 A1 | 1/2018 | Aguayo Gonzalez et al. |
| 2018/0276044 A1 | 9/2018 | Fong et al. |
| 2018/0349797 A1 | 12/2018 | Garvey et al. |
| 2019/0102718 A1 | 4/2019 | Agrawal |
| 2019/0163719 A1 | 5/2019 | Gross et al. |
| 2019/0188584 A1 | 6/2019 | Roa et al. |
| 2019/0196892 A1 | 6/2019 | Matei et al. |
| 2019/0197145 A1 | 6/2019 | Gross et al. |
| 2019/0209022 A1* | 7/2019 | Sobol ................. A61B 5/02055 |
| 2019/0237997 A1 | 8/2019 | Tsujii et al. |
| 2019/0243799 A1 | 8/2019 | Gross et al. |
| 2019/0286725 A1 | 9/2019 | Gawlick et al. |
| 2019/0324430 A1 | 10/2019 | Herzog et al. |
| 2019/0378022 A1 | 12/2019 | Wang et al. |
| 2020/0201950 A1 | 6/2020 | Wang et al. |
| 2020/0387753 A1 | 12/2020 | Brill et al. |
| 2021/0081573 A1 | 3/2021 | Gross et al. |
| 2021/0158202 A1 | 5/2021 | Backlawski et al. |
| 2021/0174248 A1 | 6/2021 | Wetherbee et al. |
| 2021/0270884 A1 | 9/2021 | Wetherbee et al. |
| 2023/0121897 A1 | 4/2023 | Liu et al. |

FOREIGN PATENT DOCUMENTS

| | | | | |
|---|---|---|---|---|
| CN | 107208394 A | * | 9/2017 | ............... E02F 9/67 |
| CN | 108344564 A | | 7/2018 | |
| CN | 109389241 A | * | 2/2019 | ........... G07C 5/0825 |
| CN | 110941020 A1 | | 3/2020 | |
| JP | H10313034 A | * | 11/1998 | |
| JP | 2000131363 A | * | 5/2000 | |
| JP | 3544251 B2 | * | 7/2004 | |
| JP | 2012-150820 A | | 8/2012 | |
| JP | 2017021282 A | | 1/2017 | |
| JP | 2018195945 A | | 12/2018 | |
| KR | 19990077643 A | | 10/1999 | |
| KR | 20170096133 A | | 8/2017 | |

OTHER PUBLICATIONS

Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.

Dickey et al.; Checking for Autocorrelation in Regression Residuals; pp. 959-965; Proceedings of 11th Annual SAS Users Group International Conference; 1986.

Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.

Gou, Yuhua, "Implementation of 3d Kiviat Diagrams." (2008). (Year: 2008).

Wang, Ray C., et al., Process Fault Detection Using Time-Explicit Kiviat Diagrams. AIChE Journal 61.12 (2015): 1277-4293.

Kenny Gross, Oracle Labs; MSET2 Overview: "Anomaly Detection and Prediction" Oracle Cloud Autonomous Prognostics; p. 1-58; Aug. 8, 2019.

Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.

Gross, K. C. et al., "Application of a Model-Based Fault Detection System to Nuclear Plant Signals," downloaded from https://www.researchgate.net/publication/236463759; Conference Paper: May 1, 1997, 5 pages.

Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.

Liao et al., "Predicting remaining useful life of an individual unit using proportional hazzards model and logistics regression model", IEEE 2006.

Martin et al., "Inferential models", Indiana University, Feb. 2011.

Wald, A, "Sequential Probability Ratio Test for Reliability Demonstration", John Wiley & Sons, 1947.

Patent Cooperation Treaty (PCT), International Search Report and Written Opinion issued in PCT International Application No. PCT/US2021/062380 having a date of mailing of May 24, 2022 (10 pgs).

Patent Cooperation Treaty (PCT), International Search Report and Written Opinion issued in PCT International Application No. PCT/US2020/060083 having a date of mailing of Mar. 19, 2021 (13 pgs).

Patent Cooperation Treaty (PCT), International Search Report and Written Opinion issued in PCT International Application No. PCT/US2021/015802 having a date of mailing of May 28, 2021 (13 pgs).

Patent Cooperation Treaty (PCT), International Search Report and Written Opinion issued in PCT International Application No. PCT/US2021/013633 having a date of mailing of May 6, 2021 (10 pgs).

Huang H, et al. "Electronic counterfeit detection based on the measurement of electromagnetic fingerprint," Microelectronics Reliability: an Internat . Journal & World Abstracting Service, vol. 55, No. 9, Jul. 9, 2015 (Jul. 9, 2015) pp. 2050-2054.

Patent Cooperation Treaty (PCT), International Search Report and Written Opinion issued in PCT International Application No. PCT/US2021/014106 having a date of mailing of Apr. 26, 2021 (9 pgs).

Patent Cooperation Treaty (PCT), International Search Report and Written Opinion issued in PCT International Application No. PCT/US2021/015359 having a date of mailing of Apr. 9, 2021 (34 pgs).

Whisnant et al.; "Proactive Fault Monitoring in Enterprise Servers," IEEE—International Multiconference in Computer Science & Computer Engineering (Jun. 27-30, 2005) 11 pgs.

(56) References Cited

OTHER PUBLICATIONS

US Nuclear Regulatory Commission; "Technical Review of On-Line Monitoring Techniques for Performance Assessment," vol. 1, Jan. 31, 2006.
Patent Cooperation Treaty (PCT), International Search Report and Written Opinion issued in PCT International Application No. PCT/US2020/039630 having a date of mailing of Nov. 10, 2020 (19 pgs).
Japanese Patent Office, Notice of Reasons for Refusal issued in Japanese Patent Application No. 2022-514593 National Entry from International Application No. PCT/US2020/039630 having a date of mailing of May 7, 2024 (5 pgs).

* cited by examiner

USING AN IRRELEVANCE FILTER TO FACILITATE EFFICIENT RUL ANALYSES FOR ELECTRONIC DEVICES

CROSS REFERENCE TO RELATED APPLICATION

This disclosure is a continuation of and claims the benefit of priority to U.S. patent application Ser. No. 16/560,629, entitled "Using an Irrelevance Filter to Facilitate Efficient RUL Analyses for Utility System Assets," filed Sep. 4, 2019, assigned to the present assignee, which is incorporated herein by reference in its entirety for all purposes.

FIELD

The disclosed embodiments generally relate to techniques for improving the reliability of electrical devices including electrical utility systems. More specifically, the disclosed embodiments relate to a technique that uses an irrelevance filter to facilitate efficient remaining useful life (RUL) analyses to improve the reliability of electrical devices in the field.

BACKGROUND

Utility system assets, such as power transformers, are critical for ensuring the uninterrupted delivery of electrical power from power generation facilities to consumers in electrical distribution grids. Electrical grids are typically "fault tolerant" with respect to losing generation assets, because whenever a power plant fails, replacement power can usually be pulled through the distribution grid to meet consumer demand. In contrast, power transformer failures typically lead to "blackouts," which may affect consumers in small areas comprising a few blocks, or may possibly affect consumers throughout a large service region comprising multiple square miles. Also, the failure of a single transformer can potentially cause a very large voltage spike to be propagated throughout the distribution grid, which can cause other transformers to fail, and can lead to a large-scale, regional blackout affecting hundreds of square miles. Transformer explosions can also cause fires, which can result in significant property damage and loss of life. Hence, it is desirable to be able to monitor the operational health of power transformers, if possible, to identify degraded transformers before they fail.

The present state of the art for power transformer monitoring is dissolved gas analysis (DGA). DGA operates by detecting the presence of dissolved hydrocarbon gasses in oils, which are used to bathe the transformer windings. When components inside a transformer become hot enough to generate hydrocarbon gasses, this indicates a heat-related problem in the transformer. The problem with DGA is that it requires oil samples to be periodically extracted from transformers and chemical analyses to detect the presence of the hydrocarbon gasses. This process is both time-consuming and expensive, which means that DGAs are performed infrequently, for example once a year. Moreover, a DGA is essentially "reactive" and not "prognostic" because it detects the downstream symptoms of problems, well after the problems developed that caused hotspots that were sufficient to "bake out" the hydrocarbon gasses.

Some researchers have investigated the possibility of determining a remaining useful life (RUL) for a power transformer using prognostic-surveillance techniques that analyze time-series sensor signals produced by power transformers. (For example, see U.S. patent application Ser. No. 16/295,613, entitled "Estimating the Remaining Useful Life of a Power Transformer based on Real-Time Sensor Data and Periodic Dissolved Gas Analyses," by inventors Kenny C. Gross, et al., filed on 7 Mar. 2019, which is hereby incorporated herein by reference.) However, one challenge that needs to be addressed for these prognostic-surveillance techniques is that utility system assets tend to fail infrequently. This means there may not exist sufficient historical failure data to determine whether an anomalous pattern of sensor signals is indicative of an impending failure, or is simply a new pattern of sensor signals, which is not correlated with an impending failure. This lack of historical failure data means that prognostic-surveillance techniques are likely to generate a high rate of false alarms, which leads to unnecessary maintenance operations, and may cause utility system assets to be prematurely replaced.

SUMMARY

The disclosed embodiments provide systems and methods that estimate a remaining useful life (RUL) of an electronic device, which may be a utility system asset, an electro-mechanical device, or other type of electronic-based device. Although the present disclosure is described with reference to a utility system asset as an embodiment, the present systems and methods may be applied to other types of electronic devices. For example, utility system assets may include but are not limited to power transformers, switches, circuit breakers, power storage units (e.g., batteries, cells), power generating systems and/or components (e.g., power generators, solar panels, wind turbines, hydroelectric components, or other type of electronic devices. The present systems and methods may be applied in a similar manner to other electronic devices, for example, including but not limited to, vehicle components including engines, electric vehicle batteries, control systems, etc.; computing systems and computing components including smart devices, phones, laptops, servers, processors, data storage devices, displays/monitors, networking equipment, or other types of computing system-based components.

In one embodiment, a method performed by the present system estimates a remaining useful life (RUL) of an electronic device is disclosed. For example, during a surveillance mode, the method comprises the following actions/functions. A set of time-series signals gathered from sensors in the electronic device are received while the electronic device is operating. Statistical changes are detected in the set of time-series signals that are deemed as anomalous signal patterns. A set of anomaly alarms are generated, wherein an anomaly alarm is generated for each of the anomalous signal patterns. An irrelevance filter is applied to the set of anomaly alarms to produce filtered anomaly alarms, wherein the irrelevance filter removes anomaly alarms associated with anomalous signal patterns that are not correlated with previous failures of similar electronic devices. A logistic-regression model is used to compute an RUL-based risk index for the electronic device based on the filtered anomaly alarms. When the risk index exceeds a risk-index threshold, a notification is generated indicating that the electronic device has a limited remaining useful life (e.g., device is near a failing point and/or should be replaced).

In another embodiment, during a surveillance mode, the system iteratively performs the following operations. First, the system receives a set of present time-series signals gathered from sensors in the utility system asset. Next, the system uses an inferential model to generate estimated values for the set of present time-series signals, and performs a pairwise differencing operation between actual values and the estimated values for the set of present time-series signals to produce residuals. The system then performs a sequential probability ratio test (SPRT) on the residuals to produce SPRT alarms. Next, the system applies an irrelevance filter to the SPRT alarms to produce filtered SPRT alarms, wherein the irrelevance filter removes SPRT alarms for signals that are not correlated with previous failures of similar utility system assets. The system then uses a logistic-regression model to compute an RUL-based risk index for the utility system asset based on the filtered SPRT alarms. Finally, when the risk index exceeds a risk-index threshold, the system generates a notification indicating that the electronic device has a limited remaining useful life (e.g., is near a failing point) and should be replaced.

In some embodiments, the system periodically updates the logistic-regression model and the irrelevance filter based on time-series signals from additional utility system assets that have failed.

In some embodiments, to reduce computational workload, the RUL-based index is computed for a utility system asset only when more than a threshold number of filtered SPRT alarms were generated during a preceding time interval.

In some embodiments, during an inferential-training mode, which precedes the surveillance mode, the system receives an inferential training set of time-series signals gathered from sensors in the utility system asset during normal fault-free operation. Next, the system trains the inferential model to predict values of the time-series signals based on the inferential training set.

In some embodiments, during an RUL-training mode, which precedes the surveillance mode, the system receives an RUL training set comprising time-series signals gathered from sensors in similar utility system assets while the similar utility system assets are run to failure. The system also receives associated failure times for the similar utility system assets. Next, the system uses the inferential model to generate estimated values for the RUL training set of time-series signals. The system then performs a pairwise differencing operation between actual values and the estimated values for the RUL training set of time-series signals to produce residuals. Next, the system performs a SPRT on the residuals to produce SPRT alarms with associated tripping frequencies. Finally, the system trains the logistic-regression model to predict an RUL for the utility system asset based on correlations between the SPRT alarm tripping frequencies and the failure times for the similar utility system assets.

In some embodiments, during the RUL-training mode, the system also configures the irrelevance filter. During this process, the system identifies relevant anomaly alarms that were generated during a time interval before a utility system asset failed, and then configures the irrelevance filter to remove anomaly alarms that are not relevant.

In some embodiments, while training the logistic-regression model to predict the RUL for the utility system asset, the system only considers SPRT alarm tripping frequencies associated with relevant SPRT alarms.

In some embodiments, the time-series signals gathered from sensors in the utility system asset include signals specifying one or more of the following: temperatures; currents; voltages; resistances; capacitances; vibrations; dissolved gas metrics; cooling system parameters; and control signals.

In some embodiments, the inferential model comprises a Multivariate State Estimation Technique (MSET) model.

In some embodiments, the utility system asset comprises a power transformer.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments make use of a novel "irrelevance filter," which mimics the functionality of the human brain's basal ganglia to facilitate improved RUL prognostics for large populations of high-cost utility grid assets, especially high-voltage transformers. Many industries are presently benefitting from a new science called "biomimicry"

that analyzes nature's best ideas and adapts them for engineering use cases. The invention disclosed herein provides an example of biomimicry.

Swedish researchers performing MRI studies on human brains discovered that the basal ganglia act as an "irrelevance filter," which plays a crucial role in human memory and cognition. If the human brain tried to process and store all inputs coming in through the senses, the brain would be overwhelmed. The basal ganglia weeds out unnecessary information, thereby leaving only those details essential to form memories that contribute to survival of a species, such as memories associated with: acquisition of food; avoidance of danger; propagation of the species; and assurance that basic needs are met. It has been shown that humans with the best memories have highly active basal ganglia.

This basal ganglia paradigm can be useful for facilitating certain types of engineering-related tasks. For example, researchers are beginning to explore the possibility of using machine learning (ML), which is based on surveillance of time-series signals obtained from sensors in utility system assets, to facilitate the scheduling of maintenance operations. It has been demonstrated that ML pattern-recognition techniques can be trained using sensor signals generated when an asset is deemed to be operating without faults, and can then be used to detect anomalous signal patterns for that asset, which can be used to schedule predictive maintenance to remediate the underlying causes of the anomalous signal patterns.

Note that it is extremely valuable for the asset operator to receive an alarm comprising an early warning about a potential problem. This makes it possible to take the asset out of service as soon as possible to quickly diagnose the root cause of the anomalous signals. However, when there exists a large population of similar assets, what is more valuable is RUL estimation, which provides an estimate of how long that asset will be able to operate safely before the probability of catastrophic failure reaches a critical threshold (e.g. 95% probability of failure). For example, two transformers in a utility grid may both issue early warning alerts. However, if the service organization knows that a first transformer has an RUL estimate of 2 months, but a second transformer is likely to fail in the next 72 hours, it is more beneficial to schedule emergency remediation operations on the second transformer, and to wait for a "convenient maintenance window" to remediate the first transformer.

However, for high-cost and high-reliability utility assets, which fail infrequently, existing RUL-estimation techniques may not work well because only a handful of assets have actually failed in service. This means there may not exist sufficient training data for an ML technique to be able to detect anomalous signal patterns that are correlated with asset failures. For example, a given asset may produce anomalous time-series signal patterns that have never been seen before on that asset, and which would consequently generate an alarm. However, such anomalous patterns might be deemed "irrelevant" if the same patterns were previously observed in other healthy assets that have operated without incident for years. This means that many prognostic-surveillance alarms will wind up being false alarms. For example, an anomalous (but harmless) pattern of time-series signals may be associated with: a relatively new asset; an asset operating in an environment with large temperature fluctuations; or an asset operating in an environment with large fluctuations in electrical flow (e.g., from population changes or utility grid reconfigurations). Such alarms may be caused by new patterns in time-series data for individual assets, but may have no prognostic-health significance.

Hence, what is needed is an "irrelevance filter" that processes time-series signals for utility system assets that have been run to failure, and produces optimal weighting factors for an associated RUL methodology. Note that this is analogous to the functionality of a basal ganglia "filter" for a human brain, which receives large streams of neural "signals" associated with the five primary senses, and periodically "alerts" the human to patterns that have direct relevance to danger, subsistence, or propagation-of-species opportunities.

Our new ML-based technique operates by processing data historian files. More specifically, when a population of utility system assets, such as high-voltage transformers, is monitored, the time-series telemetry signals are continuously stored in data historian files, wherein there exists one (logical) data historian file for each monitored asset. These data historian files can be "harvested" continuously (e.g., in 1 to 15 minute increments) and added to a large database, where they are processed to discover trends, anomalies, environmental problems, and other incipient problems.

Our anomaly discovery process uses a systematic binary hypothesis technique called the "sequential probability ratio test" (SPRT) as an irrelevance filter for large volumes of time-series signals, and identifies small subsets of time-series signals that warrant further pattern-recognition analyses to facilitate anomaly detection. Hence, our new technique substantially reduces RUL-analysis costs by systematically and safely filtering anomaly alerts generated for individual utility system assets so that RUL-analysis operations are only performed for "relevant" signature patterns that are likely to be associated with incipient fault conditions.

Before we describe the operation of our new RUL-estimation technique further, we first describe an exemplary prognostic-surveillance system in which the new technique operates.

Prognostic-Surveillance System

Figure 1:
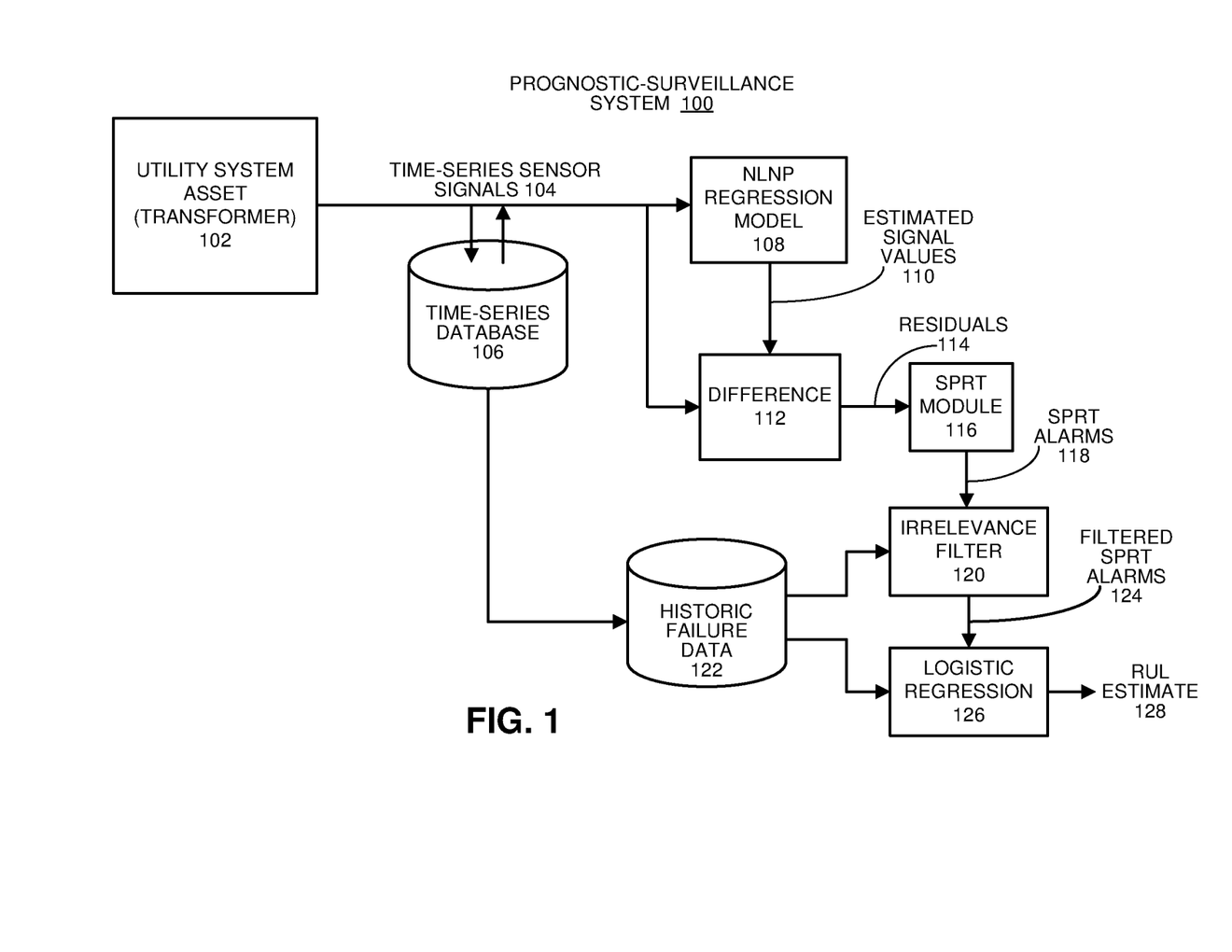
FIG. 1 illustrates an exemplary prognostic-surveillance system for a utility system asset in accordance with the disclosed embodiments.

FIG. 1 illustrates an exemplary prognostic-surveillance system 100 in accordance with the disclosed embodiments. As illustrated in FIG. 1, prognostic-surveillance system 100 operates on a set of time-series sensor signals 104 obtained from sensors in an electronic device. In one embodiment as described herein, the electronic device may be a utility system asset 102, such as a power transformer, but other electronic devices may be used. Note that time-series signals 104 can originate from any type of sensor, which can be located in a component in utility system asset 102, including: a voltage sensor; a current sensor; a pressure sensor; a rotational speed sensor; and a vibration sensor. We denote these time-series sensor signals as $X=[X_1, \ldots, X_m]$, where $X(t)=[X_1(t), \ldots, X_m(t)]$ is the value of the time-series sensor signals at time t.

During operation of prognostic-surveillance system 100, time-series signals 104 feed into a time-series database 106, which stores the time-series signals 104 for subsequent analysis. Next, the time-series signals 104 either feed directly from utility system asset 102 or from time-series database 106 into a non-linear, non-parametric (NLNP) regression model 108. Upon receiving the time-series sensor signals 104, NLNP regression model 108 performs a non-linear, non-parametric regression analysis on the samples (including a "current sample"). When the analysis is complete, NLNP regression model 108 outputs estimated signal values 110.

In one embodiment of the present invention, NLNP regression model 108 uses a multivariate state estimation technique ("MSET") to perform the regression analysis.

Note that the term MSET as used in this specification refers to a technique that loosely represents a class of pattern recognition techniques. (For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies,* Washington DC, Nov. 13-17, 2000.) Hence, the term "MSET" as used in this specification can refer to any technique outlined in [Gribok], including Ordinary Least Squares (OLS), Support Vector Machines (SVM), Artificial Neural Networks (ANNs), MSET, or Regularized MSET (RMSET). Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Before MSET is used to monitor a system, a model is constructed from which estimates of the system's correct operational state are made. The model is derived empirically from observations made during a training phase on the real system under expected normal operating conditions. Relationships among the signals are learned during the training phase, and these relationships then are used in the surveillance phase of the algorithm to compute estimates of the system state.

An observation of the system state is represented by a vector V of length n, where n is the number of signals in the system. Although the state vector elements do not need to be linearly independent, there must be some degree of correlation (though not necessarily linear) among the element values.

State vectors collected during the training phase are arranged in a state matrix with m column vectors, each column vector being a state vector of length n that stores the values of all signals at a particular point in time during the training phase. The quality of the estimates produced during the MSET surveillance phase depends on how well the subset of m state vectors represents the expected behavior of the system as observed during the training phase.

More formally, a state vector $X(t_i)$ is defined as:

$$X(t_j) = [x_1(t_j), x_2(t_j), \ldots, x_n(t_j)]^T,$$

where $x_i(t_j)$ is the measurement from signal i at time $t_j$. Then the state matrix D can be defined as $D = [X(t_1), X(t_2), \ldots, X(t_m)]$.

When MSET is monitoring a system for degradation in its surveillance phase, the state matrix D acts as a fixed model of the system from which signal values are estimated. Suppose for the time being that the signal measurements represent linearly correlated phenomena. Then one can express a state vector as a linear combination of the column vectors stored in the state matrix D, assuming that D sufficiently spans the operational space of the system. Minimizing the Euclidean norm between the estimated state vector $X_{est}$ and actual state vector $X_{obs}$ gives the following linearly optimal estimate of X(t):

$$X_{est} = D(D^T D)^{-1} D^T X_{obs}. \quad \text{(Eq. 1)}$$

Real systems, however, are rarely linear. It is desired to extend the formalism of the linear approach in Eq. 1 (most importantly, the concept of expressing an estimated state vector as a function of both the current state vector and a history of learned state vectors) to nonlinear systems. Adhering to the general formalism in Eq. 1 is also attractive from the standpoint that the model can be extended by adding new state vectors to D. With these benefits in mind, one can maintain the form of the linear estimation equation while replacing some of the linear matrix operators with a nonlinear matrix operator $\otimes$:

$$X_{est} = D(D^T \otimes D)^{-1} D^T \otimes X_{obs}. \quad \text{(Eq. 2)}$$

The value of $X_{est}$ given by Eq. 2 is called the MSET estimate for observation $X_{obs}$. The nonlinear operator $\otimes$ must preserve the following properties:

The matrix $D^T \otimes D$ must be nonsingular.

The estimation vector $X_{est}$ must represent an optimum estimation even if some elements of $X_{obs}$ fall outside the range of the same elements in D (i.e., when an observed signal value is less than the minimum or greater than the maximum value of the signal observed during the training phase).

If the observation vector $X_{obs}$ is identical to one of the column vectors in D, then the estimation vector $X_{est}$ must be identical to $X_{obs}$.

The difference between $X_{obs}$ and $X_{est}$ must be minimized.

Nonlinear operators that fulfill these conditions exist and have been shown to be successful in monitoring real systems.

Returning back to FIG. 1, NLNP regression model 108 is "trained" to learn patterns of correlation among the time-series signals 104. This training process involves a one-time, computationally intensive computation, which is performed offline with accumulated data that contains no anomalies. The pattern-recognition system is then placed into a "real-time surveillance mode," wherein the trained NLNP regression model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114, which are passed into SPRT module 116. For the embodiment of the present invention that uses MSET regression analysis, the residual can be calculated using the following expression:

$$R(t) = X(t) - MSET(X(t)).$$

SPRT module 116 then performs a "detection operation" on the residuals 114 to detect anomalies and possibly to generate SPRT alarms 118. SPRT module uses the sequential probability ratio test (SPRT) proposed by Wald to detect subtle statistical changes in a stationary noisy sequence of observations at the earliest possible time. (See Wald, Abraham, June 1945, "Sequential Tests of Statistical Hypotheses," *Annals of Mathematical Statistics,* 16 (2): 117-186.) For purposes of exposing the details of the SPRT, assume that the monitored process signal Y is normally distributed with mean zero and standard deviation $\sigma$ (processes with nonzero mean $\mu$ can be transformed into a zero-meaned process by subtracting $\mu$ from each observation). Process signal Y is said to be degraded if the observations made on Y appear to be distributed about mean M with normal (Gaussian) distribution instead of mean zero, where M is a predetermined system disturbance magnitude.

The SPRT provides a quantitative framework for deciding between two hypotheses related to this concept of signal degradation: (1) $H_0$: observations of Y are drawn from a normal distribution with mean zero and standard deviation $\sigma$; and (2) $H_1$: observations of Y are drawn from a normal distribution with mean M and standard deviation $\sigma$.

We will suppose that if $H_0$ or $H_1$ is true, then we wish to decide for $H_0$ or $H_1$ with probabilities (1−α) or (1−β), respectively, where α and β represent the error misidentification probabilities (hence, it follows that 0≤α, β≤1). Stated another way, α is the false alarm probability, which is the probability of accepting $H_1$ when $H_0$ is true, and β is the missed alarm probability, which is the probability of accepting $H_0$ when $H_1$ is true.

The likelihood ratio $L_n$ can be calculated after n observations $y_1, y_2, \ldots, y_n$ of Y as $$L_n = \frac{Pr(y_1, y_2, \ldots, y_n | H_1)}{Pr(y_1, y_2, \ldots, y_n | H_0)}$$

where Pr $(y_1, y_2, \ldots, y_n | H_i)$ is the probability of observing sequence $y_1, y_2, \ldots, y_n$ given that Hi is true. Taking the natural log of the likelihood ratio and assuming independent observations produces $$L_n = \sum_{i=1}^{n} \frac{Pr(y_i | H_1)}{Pr(y_i | H_0)}. \quad \text{(Eq. 3)}$$

Wald's theory states that sampling Y continues as long as $A < L_n < B$, where A and B are acceptance thresholds related to the error misidentification probabilities α and β, $$A = \frac{\beta}{1-\alpha} \quad B = \frac{1-\beta}{\alpha}.$$

We stop sampling Y and decide $H_1$ as soon as $L_n > B$, and we stop sampling and decide $H_0$ as soon as $L_n < A$. Note that to monitor the system continuously, the SPRT algorithm resets itself as soon as a decision has been made. For example, if the likelihood ratio crosses the A threshold, signifying that the process signal is not degraded at that time, then the next sample is treated as the first sample (n=1 according to Eq. 3) in a new sequence of observations.

Assuming that the observations $y_1, y_2, \ldots, y_n$ of Y are normally distributed yields a particularly compact expression for Eq. 3:

$$L_n = \frac{M}{\sigma^2} \sum_{i=1}^{n} y_i \frac{M}{2}. \quad \text{(Eq. 4)}$$

Following Wald's sequential analysis, it has been shown that a decision test based on the SPRT has an optimal property; that is, for given probabilities α and β there is no other procedure with at least as low error probabilities or expected risk and with shorter length average sampling time than the SPRT. It is because of this property and the inherent simplicity of equation (2) that the SPRT is popular for monitoring stationary Gaussian random processes.

Note that the SPRT presented above is a parametric test, meaning that the probability density function and associated parameters must be known prior to applying the SPRT. Eq. 4 is derived for normally distributed observations of process signal Y; one can derive expressions for other distributions (e.g., exponential, Poisson, binomial) as well. In practical computing systems, however, it may be difficult to assume that:

The distribution of a process signal is known in advance.
The distribution of the process signal does not change over time.
The parameters of the distribution do not change over time.

Nonparametric sequential detection tests do exist, but the mathematics behind them are considerably more complex than presented above for the parametric SPRT. Even if the a priori distribution is known, the third assumption is often violated in practical computing systems. A nominally stationary Gaussian random process may enter a new operating regime (characterized by a different mean value or different higher moments) upon influence from stimuli. In executing computing systems, for example, a sudden workload change may cause a monitored voltage or current signal to have an upward or downward step change in its nominal value. The SPRT recognizes such a step change as a degraded signal, since the observations no longer appear to be drawn from a distribution conforming to the original $H_0$ hypothesis.

Referring to FIG. 1, NLNP regression model 108 and difference module 112 work together to remove (filter) the dynamics in the signals X(t) so that the residual R(t) is a stationary random process when the system is in good condition. As the system ages or degrades due to a failure mechanism, the statistical properties of the residual change. This change is detected by SPRT module 116, which generates corresponding SPRT alarms 118.

During operation, SPRT module 116 applies a sequential probability ratio test to the residuals and produces an alarm when one or several residuals become statistically different from the residual corresponding to the undegraded condition of the system.

The SPRT alarms 118 then feed through an irrelevance filter 120, which removes SPRT alarms for signals that are not correlated with previous failures of similar utility system assets to produce filtered SPRT alarms 124. Filtered SPRT alarms 124 feed into a logistic-regression model 126, which generates an RUL estimate 128, wherein the RUL estimate 128 can be expressed as a "quantitative risk index" as is described in more detail below.

While calculating RUL estimate 128, logistic-regression model 126 records each instance an alarm in filtered SPRT alarms 124, and uses these instances to determine the current alarm-tripping frequency. As degradation progresses, the tripping frequency of the filtered alarms increases. We denote these alarm-tripping frequencies as $F=[F_1, \ldots F_m]$, where $F(t)=[F_1(t), \ldots F_m(t)]$ is the value of the prognostic parameters at time t. Hence, at time t: $F(t)=SPRT(R(t))$.

Logistic-regression model 126 then calculates the RUL of utility system asset 102 in the following way. We denote the probability of system S to fail within next T hours given the current condition determined by the current SPRT alarm-tripping frequencies F as p(T,F). The relationship between the p and the current condition F is modeled using the linear logistic regression model:

$p(T,X)=1/(1+\exp(-(a(T)+b_1(T)*F_1+b_2(T)*F_2+ \ldots +b_m(T)*F_m)))$.

where a(T) and $b(T)=[b_1(T), \ldots, b_m(T)]$ are estimated from historical or experimental failure data for the system. Note that the tripping frequencies are normalized to have values between 0 and 1 to simplify this calculation.

RUL-Estimation Technique

Figure 2:
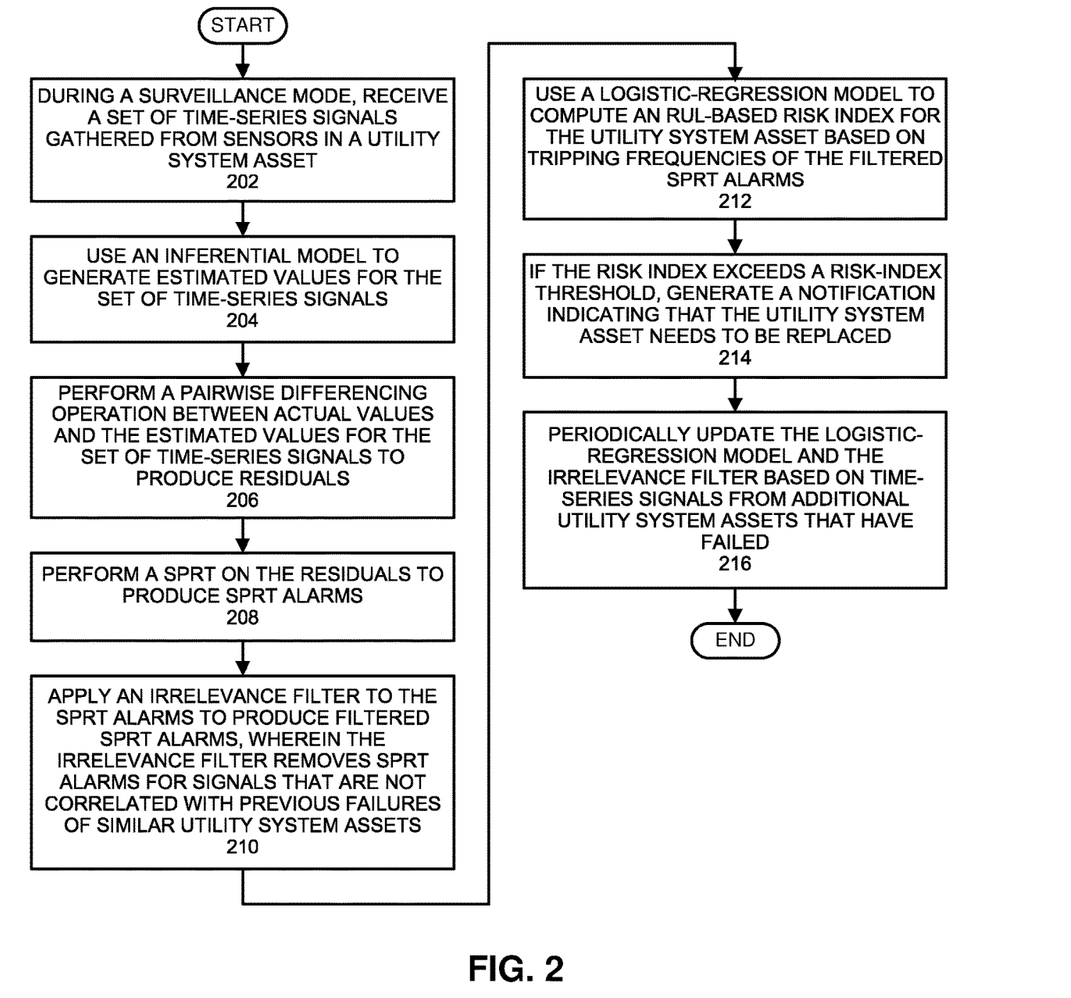
FIG. 2 presents a flow chart for a process that estimates an RUL for a utility system asset in accordance with the disclosed embodiments.

FIG. 2 presents a flow chart for a process that estimates an RUL for a utility system asset in accordance with the disclosed embodiments. In one embodiment, a notification mechanism is implemented as part of a computing system to perform one or more, or combinations of the following actions for estimating the RUL of a device. During a surveillance mode, the system iteratively performs the following operations. First, the system receives a set of present time-series signals gathered from sensors in the utility system asset (step 202). Next, the system detects statistical changes in the set of time-series signals that are deemed to be anomalous signal patterns, and generates a set of anomaly alarms, where an anomaly alarm is generated for each of the anomalous signal patterns. In another embodiment, the system detects anomalous signal patterns by using an inferential model to generate estimated values for the set of present time-series signals (step 204), and then performs a pairwise differencing operation between actual values and the estimated values for the set of present time-series signals to produce residuals (step 206). The system then performs a sequential probability ratio test (SPRT) on the residuals to produce SPRT alarms (e.g., anomaly alarms) (step 208).

Next, the system applies an irrelevance filter to the anomaly alarms (e.g., SPRT alarms) to produce a filtered anomaly alarms (e.g., SPRT alarms), wherein the irrelevance filter removes SPRT alarms for signals that are not correlated with previous failures of similar utility system assets (step 210). In other words, the irrelevance filter removes anomaly alarms associated with anomalous signal patterns that are not correlated with previous failures of similar electronic devices.

The system then uses a logistic-regression model to compute an RUL-based risk index for the utility system asset based on tripping frequencies of the filtered SPRT alarms (step 212). If the risk index exceeds a risk-index threshold, the system generates a notification indicating that the electronic device has a limited remaining useful life (e.g., is near a predicted failing point) and should be replaced (step 214). Finally, the system periodically updates the logistic-regression model and the irrelevance filter based on time-series signals from additional utility system assets that have failed (step 216).

Figure 3:
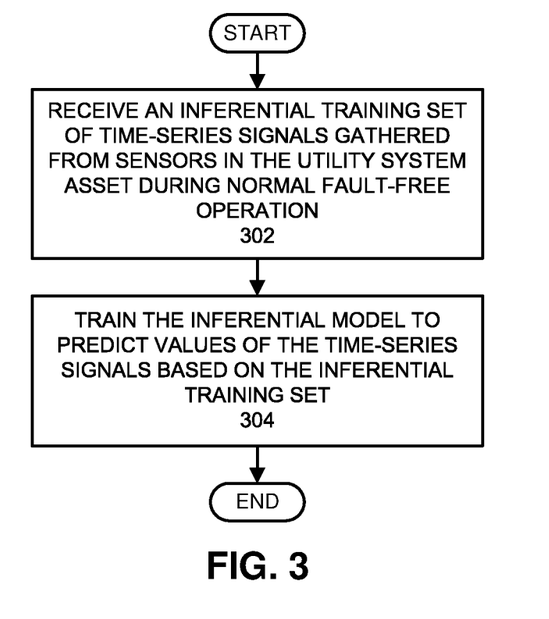
FIG. 3 presents a flow chart illustrating a process for training an inferential model for a utility system asset in accordance with the disclosed embodiments.

FIG. 3 presents a flow chart illustrating a process for training an inferential model in accordance with the disclosed embodiments. During an inferential-training mode, which precedes the surveillance mode, the system receives an inferential training set of time-series signals gathered from sensors in the utility system asset during normal fault-free operation (step 302). The system then trains the inferential model to predict values of the time-series signals based on the inferential training set (step 304).

Figure 4:
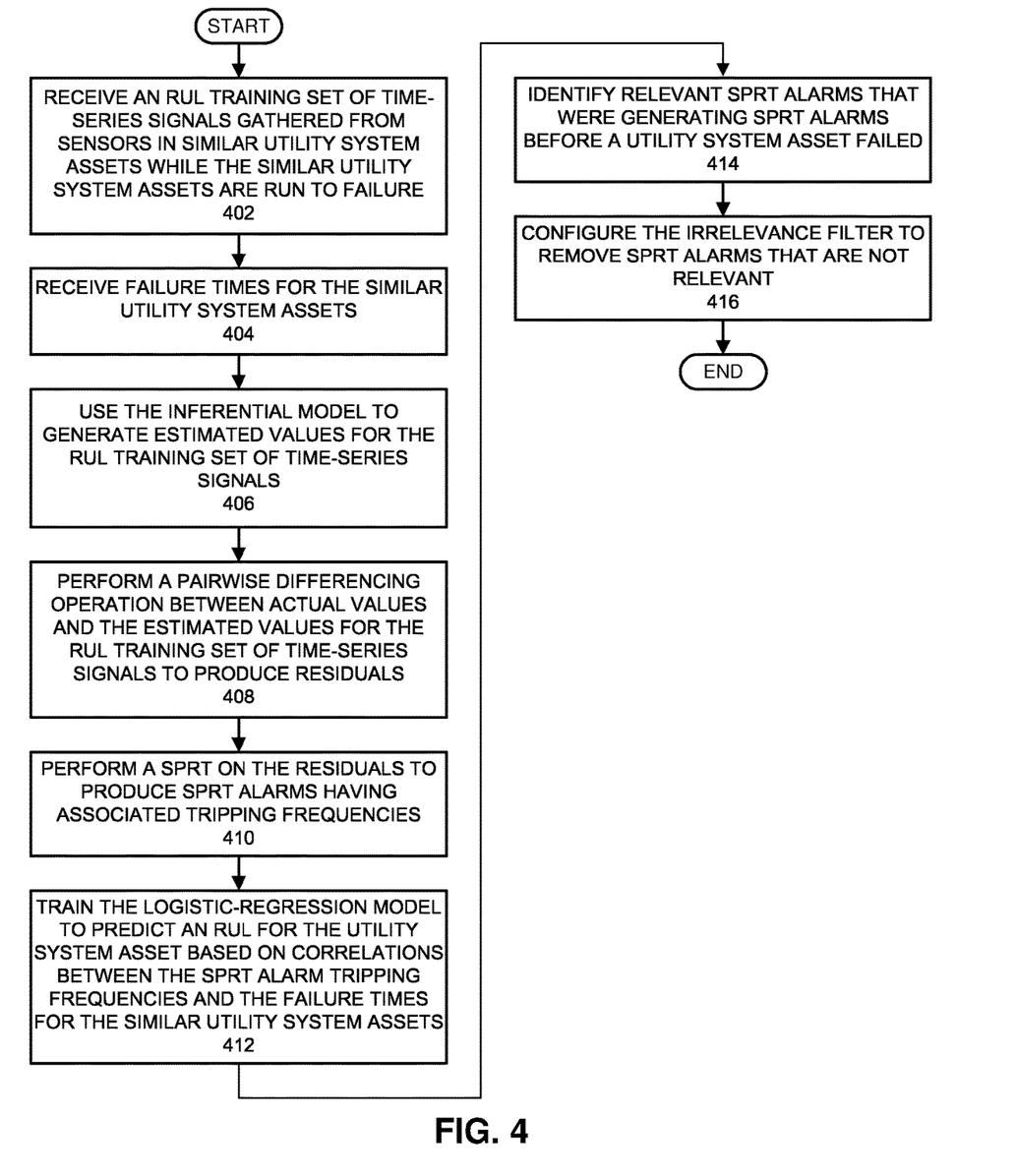
FIG. 4 presents a flow chart illustrating a process for training a logistic-regression model to predict an RUL for a utility system asset and for configuring an associated irrelevance filter in accordance with the disclosed embodiments.

FIG. 4 presents a flow chart illustrating a process for training a logistic-regression model to predict an RUL for an asset and for configuring an associated irrelevance filter in accordance with the disclosed embodiments. During an RUL-training mode, which precedes the surveillance mode, the system receives an RUL training set comprising time-series signals gathered from sensors in similar utility system assets while the similar utility system assets are run to failure (step 402). The system also receives associated failure times for the similar utility system assets (step 404). (Note that the process for determining which utility system assets are similar can involve automatically clustering the assets to form clusters comprising "like makes/models," either from a list of asset makes/models, or empirically based on the numbers and types of internal sensors. Note that even though the clusters of like makes/models may have different banks of transducers, and different numbers of sensors, what is relevant for purposes of RUL estimation is the general patterns in these time-series signals.)

Next, the system uses the inferential model to generate estimated values for the RUL training set of time-series signals (step 406). The system then performs a pairwise differencing operation between actual values and the estimated values for the RUL training set of time-series signals to produce residuals (step 408). Next, the system performs a SPRT on the residuals to produce SPRT alarms with associated tripping frequencies (step 410). The system then trains the logistic-regression model to predict an RUL for the utility system asset based on correlations between the SPRT alarm tripping frequencies and the failure times for the similar utility system assets (step 412). Next, to configure the irrelevance filter, the system identifies relevant SPRT alarms that were generated during a time interval before a utility system asset failed (step 414), such as a time interval near a failure time of the asset/device (e.g., within a time threshold to the failure time). The irrelevance filter is also configured to remove SPRT alarms (e.g., anomaly alarms) that are not relevant (step 416). SPRT alarms that are not relevant include alarms that occur in time intervals that are not near a failure time of the asset/device (e.g., a time beyond/outside the time threshold).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for estimating a remaining useful life, RUL, of an electronic device, wherein during a surveillance mode, the method comprises:
    receiving a set of time-series signals gathered from sensors in the electronic device while the electronic device is operating;
    detecting statistical changes in the set of time-series signals that are deemed as anomalous signal patterns;
    generating a set of anomaly alarms, wherein an anomaly alarm is generated for each of the anomalous signal patterns;
    applying an irrelevance filter to the set of anomaly alarms to produce filtered anomaly alarms, wherein the irrelevance filter removes anomaly alarms associated with anomalous signal patterns that are not correlated with previous failures of similar electronic devices;
    using a logistic-regression model to compute an RUL-based risk index for the electronic device based on the filtered anomaly alarms; and
    when the risk index exceeds a risk-index threshold, generating a notification indicating that the electronic device has a limited remaining useful life.

2. The method of claim 1, wherein the irrelevant filter removes an anomaly alarm associated with an anomalous signal pattern when the anomalous signal pattern matches a similar signal pattern that was previously observed from other similar electrical devices that have operated without incident.

3. The method of claim 1, wherein detecting the statistical changes in the set of time-series signals includes:
performing a sequential probability ratio test, SPRT, on the set of time-series signals or on residual signals produced from the set of time-series signals, wherein the SPRT produces SPRT alarms for the anomalous signal patterns; and
wherein the SPRT alarms are the anomaly alarms.

4. The method of claim 1, wherein detecting the statistical changes in the set of time-series signals is based at least in part on detecting the statistical changes in residual signals produced from the set of time series signals;
wherein the method further comprises, prior to the detecting:
using an inferential model to generate estimated values for the set of time-series signals; and
performing a pairwise differencing operation between actual values of the set of time-series signal and the estimated values for the set of time-series signals to produce the residual signals.

5. The method of claim 4, wherein the inferential model comprises a Multivariate State Estimation Technique, MSET, model.

6. The method of claim 1, wherein during an RUL-training mode, which precedes the surveillance mode, the method comprises:
receiving an RUL training set comprising time-series signals gathered from sensors in similar electronic devices while the similar electronic devices are run to failure;
receiving associated failure times for the similar electronic devices;
using an inferential model to generate estimated values for the RUL training set of time-series signals;
performing a pairwise differencing operation between actual values and the estimated values for the RUL training set of time-series signals to produce residuals;
performing a sequential probability ratio test, SPRT, on the residuals to produce SPRT alarms with associated tripping frequencies; and
training a logistic-regression model to predict an RUL for the electronic device based on correlations between the SPRT alarm tripping frequencies and the failure times for the similar electronic devices.

7. The method of claim 6, wherein during the RUL-training mode, the method additionally configures the irrelevance filter by:
identifying relevant SPRT alarms that were generated during a time interval near the associated failure times of a similar electronic device; and
configuring the irrelevance filter to remove SPRT alarms that are not relevant.

8. The method of claim 7, wherein while training the logistic-regression model to predict the RUL for the electronic device, the method considers SPRT alarm tripping frequencies associated with relevant SPRT alarms.

9. The method of claim 1, wherein the time-series signals gathered from sensors in the electronic device include signals specifying one or more combinations of the following:
temperatures;
currents;
voltages;
resistances;
capacitances;
vibrations;
dissolved gas metrics;
cooling system parameters; and
control signals.

10. The method of claim 1, wherein the electronic device is a utility system asset, a vehicle component, or a computing system device.

11. A non-transitory computer-readable storage medium storing instructions that when executed by a computer cause the computer to estimate a remaining useful life, RUL, of an electronic device, wherein the computer is caused to:
receive a set of time-series signals gathered from sensors in the electronic device while the electronic device is operating;
detect statistical changes in the set of time-series signals that are deemed as anomalous signal patterns;
generate a set of anomaly alarms, wherein an anomaly alarm is generated for each of the anomalous signal patterns;
apply an irrelevance filter to the set of anomaly alarms to produce filtered anomaly alarms, wherein the irrelevance filter removes anomaly alarms associated with anomalous signal patterns that are not correlated with previous failures of similar electronic devices;
use a logistic-regression model to compute an RUL-based risk index for the electronic device based on the filtered anomaly alarms; and
when the risk index exceeds a risk-index threshold, generate a notification indicating that the electronic device has a limited remaining useful life.

12. The non-transitory computer-readable storage medium of claim 11,
wherein the irrelevant filter is configured to remove an anomaly alarm associated with an anomalous signal pattern when the anomalous signal pattern matches a similar signal pattern that was previously observed from other similar electrical devices that have operated without failing.

13. The non-transitory computer-readable storage medium of claim 11, wherein the instructions to detect the statistical changes in the set of time-series signals further include instructions that when executed cause the computer to:
perform a sequential probability ratio test, SPRT, on the set of time-series signals or on residual signals produced from the set of time-series signals, wherein the SPRT produces SPRT alarms for the anomalous signal patterns; and
wherein the SPRT alarms are the anomaly alarms.

14. The non-transitory computer-readable storage medium of claim 11,
wherein the instructions to detect the statistical changes in the set of time-series signals further include instructions that when executed cause the computer to:
detect the statistical changes in residual signals produced from the set of time series signals;
wherein the residual signals are produced by:
using an inferential model to generate estimated values for the set of time-series signals; and
performing a pairwise differencing operation between actual values of the set of time-series signal and the estimated values for the set of time-series signals to produce the residual signals.

15. The non-transitory computer-readable storage medium of claim 11, further comprising instructions for causing the computer to perform an RUL-training mode comprising:

receiving an RUL training set comprising time-series signals gathered from sensors in similar electronic devices while the similar electronic devices are run to failure;

receiving associated failure times for the similar electronic devices;

using the inferential model to generate estimated values for the RUL training set of time-series signals;

performing a pairwise differencing operation between actual values and the estimated values for the RUL training set of time-series signals to produce residuals;

performing a sequential probability ratio test, SPRT, on the residuals to produce SPRT alarms with associated tripping frequencies; and training a logistic-regression model to predict an RUL for the electronic device based on correlations between the SPRT alarm tripping frequencies and the failure times for the similar electronic devices.

16. The non-transitory computer-readable storage medium of claim 15, wherein the irrelevance filter is configured to:

identify relevant anomaly alarms from the set of anomaly alarms that are generated during a time interval near a failure time of a similar electronic device; and remove anomaly alarms from the set of anomaly alarms that are not relevant.

17. The non-transitory computer-readable storage medium of claim 11, wherein while training the logistic-regression model to predict the RUL for the electronic device, the computing device is configured to consider SPRT alarm tripping frequencies associated with relevant SPRT alarms.

18. A system that estimates a remaining useful life, RUL, of an electronic device, the system comprising:

at least one processor and at least one associated memory; and a notification mechanism configured to execute on the at least one processor, wherein during a surveillance mode, the notification mechanism is configured to iteratively:

receive a set of time-series signals gathered from sensors in the electronic device while the electronic device is operating;

detect statistical changes in the set of time-series signals that are deemed as anomalous signal patterns;

generate a set of anomaly alarms, wherein an anomaly alarm is generated for each of the anomalous signal patterns;

apply an irrelevance filter to the set of anomaly alarms to produce filtered anomaly alarms, wherein the irrelevance filter removes anomaly alarms associated with anomalous signal patterns that are not correlated with previous failures of similar electronic devices;

use a logistic-regression model to compute an RUL-based risk index for the electronic device based on the filtered anomaly alarms; and when the risk index exceeds a risk-index threshold, generate a notification indicating that the electronic device is near a failure.

19. The system of claim 18, wherein during an RUL-training mode, which precedes the surveillance mode, the notification mechanism is further configured to:

receive an RUL training set comprising time-series signals gathered from sensors in similar electronic devices while the similar electronic devices are run to failure;

receive associated failure times for the similar electronic devices;

use an inferential model to generate estimated values for the RUL training set of time-series signals;

perform a pairwise differencing operation between actual values and the estimated values for the RUL training set of time-series signals to produce residuals;

perform a sequential probability ratio test, SPRT, on the residuals to produce SPRT alarms with associated tripping frequencies; and train a logistic-regression model to predict an RUL for the electronic device based on correlations between the SPRT alarm tripping frequencies and the failure times for the similar electronic devices.

20. The system of claim 19, wherein the notification mechanism is configured to detect the statistical changes in the set of time-series signals by:

performing a sequential probability ratio test, SPRT, on the set of time-series signals or on residual signals produced from the set of time-series signals, wherein the SPRT produces SPRT alarms for the anomalous signal patterns; and wherein the SPRT alarms are the anomaly alarms.

* * * * *

UNITED STATES PATENT AND TRADEMARK OFFICE
CERTIFICATE OF CORRECTION

PATENT NO. : 12,039,619 B2
APPLICATION NO. : 17/741709
DATED : July 16, 2024
INVENTOR(S) : Wetherbee et al.

It is certified that error appears in the above-identified patent and that said Letters Patent is hereby corrected as shown below:

On the Title Page

Column 1, under item (56) other publications, Line 3, delete "Amsterdan," and insert -- Amsterdam, --, therefor.

On page 2, Column 2, under item (56) other publications, Line 15, delete "1277-4293." and insert -- 4277-4293. --, therefor.

On page 2, Column 2, under item (56) other publications, Line 33, Delete "hazzards" and insert -- hazards --, therefor.

In the Specification

In Column 7, Line 60, delete "X(t):" and insert -- $X(t_i)$: --, therefor.

Signed and Sealed this
Tenth Day of December, 2024

Katherine Kelly Vidal
*Director of the United States Patent and Trademark Office*